(12) United States Patent
Benthien

(10) Patent No.: US 8,408,492 B2
(45) Date of Patent: Apr. 2, 2013

(54) FLOOR PANEL FOR FORMING A LOADING AREA IN A CARGO HOLD OF AN AIRCRAFT

(75) Inventor: Herrmann Benthien, Sottrum (DE)

(73) Assignee: Airbus Deutschland GmbH, Hamburg (DE)

( * ) Notice: Subject to any disclaimer, the term of this patent is extended or adjusted under 35 U.S.C. 154(b) by 525 days.

(21) Appl. No.: 12/008,975

(22) Filed: Jan. 15, 2008

(65) Prior Publication Data

US 2008/0173755 A1 Jul. 24, 2008

Related U.S. Application Data

(60) Provisional application No. 60/881,640, filed on Jan. 22, 2007.

(30) Foreign Application Priority Data

Mar. 9, 2007 (DE) .................. 10 2007 011 619

(51) Int. Cl.
*B64C 1/18* (2006.01)
*E04C 3/00* (2006.01)

(52) U.S. Cl. ............... 244/118.1; 244/119; 244/131; 52/578; 52/782.1; 52/837

(58) Field of Classification Search ............... 244/118.1, 244/118.2, 119, 118.3, 131, 133; 52/177, 52/578, 782.1, 837
See application file for complete search history.

(56) References Cited

U.S. PATENT DOCUMENTS

| 571,042 | A | 11/1896 | Edquist |
| 1,774,593 | A | 9/1930 | Day et al. |
| 2,194,483 | A | 3/1940 | Schmidt |
| 2,403,881 | A | 7/1946 | Tarbox |
| 2,556,076 | A | 6/1951 | Evans et al. |
| 2,556,077 | A | 6/1951 | Fetterly et al. |
| 2,625,118 | A | 1/1953 | Lechner |
| 2,642,109 | A | 6/1953 | Hollerith |
| 2,700,412 | A | 1/1955 | Evans et al. |
| 2,758,365 | A | 8/1956 | Ricefield |
| 2,789,457 | A | 4/1957 | Allen |

(Continued)

FOREIGN PATENT DOCUMENTS

DE 31 41 869 A1 5/1983
DE 19 724941 12/1998

(Continued)

OTHER PUBLICATIONS

German Office Action for DE 10 2007 011611 dated Dec. 8, 2009.

(Continued)

*Primary Examiner* — Joseph W Sanderson
(74) *Attorney, Agent, or Firm* — Jenkins, Wilson, Taylor & Hunt, P.A.

(57) ABSTRACT

A floor panel, in particular for covering floors of cargo holds of aircraft, is formed by a plurality of milled profiles, which are friction stir welded along their longitudinal edges, with preference continuously to form longitudinal (butt) seams. The milled profiles each form a beam "of equal stress", with an upper flange and a lower flange spaced apart from one another along their extent. The milled profiles have a double-T-shaped cross-sectional profile, the upper flanges and the lower flanges being respectively connected by webs. With preference, the milled profiles are milled out in one piece from solid material of a sufficiently tough aluminum alloy. The joining together of the floor panel including a plurality of milled profiles that are arranged in parallel and friction stir welded allows a high mechanical load-bearing capacity of the floor panel in comparison with conventional sandwich floor panels along with a comparatively low weight.

5 Claims, 2 Drawing Sheets

U.S. PATENT DOCUMENTS

| | | | | |
|---|---|---|---|---|
| 2,920,672 | A | 1/1960 | Bronson | |
| 3,208,496 | A | 9/1965 | Phelan | |
| 3,314,720 | A | 4/1967 | Millington et al. | |
| 3,463,424 | A | 8/1969 | Pickell | |
| 3,765,626 | A | 10/1973 | Maynard et al. | |
| 3,866,955 | A | 2/1975 | Maynard et al. | |
| 3,868,143 | A | 2/1975 | Reilly | |
| 4,005,765 | A | 2/1977 | Reilly | |
| 4,048,960 | A * | 9/1977 | Barnidge et al. | 119/529 |
| 4,266,381 | A * | 5/1981 | Deller | 52/177 |
| 4,392,623 | A | 7/1983 | Munsen et al. | |
| 4,479,621 | A | 10/1984 | Bergholz | |
| 5,180,263 | A | 1/1993 | Flowers, Jr. | |
| 5,291,704 | A * | 3/1994 | Savorani | 52/177 |
| 5,568,847 | A | 10/1996 | Guilloud et al. | |
| 5,683,131 | A | 11/1997 | Lucas | |
| 5,931,415 | A | 8/1999 | Lingard et al. | |
| 6,394,393 | B1 | 5/2002 | Mort | |
| 6,454,210 | B1 | 9/2002 | Plattner | |
| 6,530,544 | B2 | 3/2003 | Milliere | |
| 2,821,129 | A1 | 11/2003 | Bequet | |
| 6,663,314 | B2 | 12/2003 | Bequet | |
| 6,732,976 | B2 | 5/2004 | Hessling et al. | |
| 6,769,831 | B2 | 8/2004 | Aquino et al. | |
| 6,848,650 | B2 * | 2/2005 | Hoisignton et al. | 244/13 |
| 6,883,753 | B1 | 4/2005 | Scown | |
| 6,889,939 | B2 | 5/2005 | Rouyre et al. | |
| 7,021,587 | B1 | 4/2006 | Younkin | |
| 7,073,994 | B2 | 7/2006 | Huber et al. | |
| 7,214,015 | B2 | 5/2007 | Bruns | |
| 7,234,668 | B2 | 6/2007 | Wollaston et al. | |
| 7,370,452 | B2 * | 5/2008 | Rogers | 52/177 |
| 7,374,137 | B2 | 5/2008 | Staney | |
| 7,407,135 | B2 | 8/2008 | Rouyre | |
| 7,462,006 | B2 | 12/2008 | Benthien | |
| 7,497,638 | B2 | 3/2009 | Tubbs et al. | |
| 7,594,701 | B2 | 9/2009 | Kawabata et al. | |
| 7,637,686 | B2 | 12/2009 | Wood et al. | |
| 7,648,115 | B2 | 1/2010 | Lambert et al. | |
| 7,748,661 | B2 | 7/2010 | Harris et al. | |
| 7,775,479 | B2 | 8/2010 | Benthien | |
| 7,784,734 | B2 | 8/2010 | Christman | |
| 7,895,810 | B2 | 3/2011 | Benthien | |
| 8,220,744 | B2 | 7/2012 | Benthien | |
| 2003/0168554 | A1 | 9/2003 | Rouyre et al. | |
| 2003/0209929 | A1 | 11/2003 | Muin et al. | |
| 2004/0245391 | A1 * | 12/2004 | Kunzel et al. | 244/119 |
| 2004/0258498 | A1 | 12/2004 | Bruns | |
| 2005/0211833 | A1 * | 9/2005 | Frantz et al. | 244/118.1 |
| 2005/0224650 | A1 * | 10/2005 | Reed et al. | 244/119 |
| 2006/0011781 | A1 | 1/2006 | Knoll et al. | |
| 2006/0108477 | A1 * | 5/2006 | Helou, Jr. | 244/137.1 |
| 2006/0237586 | A1 | 10/2006 | Barackman et al. | |
| 2006/0278761 | A1 | 12/2006 | Cutler et al. | |
| 2008/0099601 | A1 | 5/2008 | Christman | |
| 2008/0112753 | A1 | 5/2008 | Tubbs et al. | |
| 2008/0173761 | A1 | 7/2008 | Benthien | |
| 2008/0213034 | A1 | 9/2008 | Wood et al. | |
| 2010/0044510 | A1 * | 2/2010 | Schroeer et al. | 244/119 |
| 2010/0051746 | A1 | 3/2010 | Law | |
| 2011/0108668 | A1 | 5/2011 | Benthien | |

FOREIGN PATENT DOCUMENTS

| | | |
|---|---|---|
| DE | 103 19 503 A1 | 11/2004 |
| DE | 10 324648 | 12/2004 |
| DE | 103 24 648 A1 | 12/2004 |
| DE | 698 27 627 T2 | 3/2005 |
| EP | 1234984 | 8/2002 |
| EP | 1637449 A1 | 3/2006 |
| FR | 2599793 | 11/1987 |
| FR | 2821129 | 8/2002 |
| FR | 1342927 | 9/2003 |
| FR | 2836890 | 9/2003 |
| FR | 2883939 | 10/2006 |
| GB | 2026623 | 2/1980 |
| JP | 55-017797 | 2/1980 |
| JP | 58-078895 | 5/1983 |
| RU | 1539430 A1 | 1/1990 |
| WO | 97/31820 | 9/1997 |

OTHER PUBLICATIONS

Notice of Allowance from Appl. U.S. Appl. No. 12/009,625 dated May 18, 2010.
German Office Action for DE 10 2007 011621 dated Dec. 10, 2009.
Office Action dated Dec. 14, 2009 from U.S. Appl. No. 12/009,625.
International Search Report for PCT/EP/2008/050292 dated May 19, 2008.
Notice of Allowance for U.S. Appl. No. 12/009,150 dated Sep. 30, 2008.
Notice of Allowance for U.S. Appl. No. 12/009,620 dated Oct. 15, 2010.
Non-final Office Action for U.S. Appl. No. 12/009,149 dated Oct. 19, 2010.
Non-final Office Action for U.S. Appl. No. 12/009,149 dated Mar. 18, 2011.
Final Office Action for U.S. Appl. No. 12/009,149 dated Aug. 18, 2011.
Notice of Allowance for U.S. Appl. No. 12/521,247 dated Nov. 9, 2011.
Supplemental Notice of Allowance for U.S. Appl. No. 12/521,247 dated Nov. 18, 2011.
Notice of Allowance for U.S. Appl. No. 12/009,149 dated Dec. 8, 2011.
Notice of Allowance for U.S. Appl. No. 12/521,247 dated Feb. 17, 2012.
Notice of Allowance for U.S. Appl. No. 12/009,149 dated Mar. 23, 2012.
Notice of Allowance for U.S. Appl. No. 12/521,247 dated Apr. 13, 2012.
Russian Grant Notice for RU 2009130305/11(042288) dated Jan. 13, 2012.
German Office Action for Application Serial No. DE 10 2007 011 619.7-22 dated Dec. 16, 2009.
Notice of Allowance for U.S. Appl. No. 12/521,247 dated Aug. 3, 3012.
Japanese Office Action for JP 2009-545894 dated Aug. 28, 2012.

* cited by examiner

FLOOR PANEL FOR FORMING A LOADING AREA IN A CARGO HOLD OF AN AIRCRAFT

CROSS-REFERENCE TO RELATED APPLICATIONS

This application claims the benefit of U.S. Provisional Application No. 60/881,640, filed Jan. 22, 2007 and German Patent Application No. 10 2007 011 619.7, filed Mar. 9, 2007, the entire disclosures of which are herein incorporated by reference.

FIELD OF THE INVENTION

The invention relates to a floor panel for forming a substantially continuous loading area in a cargo hold of an aircraft, comprising a plurality of beams that are arranged next to one another and connected.

BACKGROUND OF THE INVENTION

The floor in aircraft, in particular in cargo aircraft, has to meet increased mechanical requirements. The generally substantially planar and continuous floor is formed by a plurality of floor panels adjoining one another.

The floor construction is exposed, inter alia, to high mechanical loads caused by the cargo itself. High local surface pressures generally occur, caused by trolleys, the tyres of vehicles and dirt particles that may be pressed into the surface of the floor by tyres, rollers or chain links. In addition, increased attention has to be given to the so-called "impact" behaviour. This is so since handling loads, chains or tools that fall on the floor must not adversely affect the integrity of the floor.

Furthermore, the great temperature differences occurring during flight operation, of up to 125° C., must not produce any appreciable mechanical stresses within the floor. To achieve this, the floor panels are connected to the floor substructure or the fuselage cell by suitable connecting elements, which allow minor movements in at least one direction parallel to the plane of the floor (known as "floating" mounting of the floor).

In addition, the floor panels also have a bearing function. This is so since the floor panels have the task of transferring loads, for example from lashing points in the floor by way of shearing forces into the lateral connection to the skin of the fuselage cell, as a result of which their displaceability, and consequently their length, is limited. Together with channels in the floor, which serve for receiving so-called "lashing points", roller conveyors, guide rails or the like, the floor panels form a statically effective assembly and increase its overall flexural rigidity. The floor panels consequently also define the optimum load introduction point in the x direction, that is to say parallel to the longitudinal axis of the aircraft, for loads that are fastened on the floor by means of the lashing points.

On account of the required displacability of the floor panels to compensate for thermal expansions, the floor panels do not act as continuous beams, but can only be designed as beams on two supports. A weight-optimized solution for this is represented by the "beam of equal stress".

Such a beam can be produced, for example, in the form of an integrally milled panel. The machining effort is in this case very great. In addition, such a beam cannot be produced with optimum weight by a milling technique.

Alternatively, the floor panels may be formed by sandwich panels, the outer layer of which is formed by metal. When there are high local loads and great supporting widths, the weight advantage is no longer obtained. In addition, the impact resistance when high mechanical point loads occur is problematic. Delaminations caused by the impact of compact objects are among the problems that are difficult to detect, as a result of which weight-increasing safety margins have to be allowed for in the static design.

SUMMARY OF THE INVENTION

One of the objects of the invention is to provide a floor panel for the floor of an aircraft that does not have the aforementioned disadvantages and nevertheless has a low weight along with a high load-bearing capacity.

Accordingly, a floor panel for forming a continuous loading area in a cargo hold of an aircraft comprises a plurality of beams that are arranged next to one another and connected to one another, the beams being formed by milled profiles that are firmly joined together at least at certain portions along their longitudinal edges.

The fact that the beams are formed by milled profiles and the milled profiles are joined together, at least in certain portions, along longitudinal edges, means that a high mechanical load-bearing capacity is obtained even when there is a great supporting width between the resting points of the floor panel on both sides, something which is of great importance in particular in the case of floor constructions for cargo aircraft in military application areas.

In addition, the floor panel according to the invention can be produced by a conventional milling technique with a still acceptable machining effort, since the actual floor panel is only formed by welding a plurality of beams that are milled from solid material along their respective longitudinal sides.

The welding together of the beams along their longitudinal sides may be performed by means of the known friction stir welding method, which allows the creation of weld seams of a mechanical load-bearing capacity comparable to that of solid material. Alternatively, other welding methods, such as for example laser welding, may be used, or in individual cases even adhesive bonding methods.

The floor panels can be made of a tough aluminium alloy material, as a result of which high flexural stresses can be transferred. The floor panel also allows favourable load introduction of the lashing points arranged in the channels into the fuselage structure, which is formed by the outer skin of the fuselage, the (ring) frames, the transverse beams in the floor framework and the stringers (longitudinal stiffening elements).

The welding together of the milled profiles takes place on the modular principle, so that different dimensions of floor panels can be realized.

The geometry of the milled profiles may follow the geometrical shape of the so-called "beam of equal stress". This results in the maximum achievable mechanical load-bearing capacity with minimal use of material.

To avoid damage to the floor panels in cases of very high local peak loads, such as can occur, for example, when wheels and/or chain links are left standing, it may be necessary for the floor panels to be additionally lined, at least in certain regions, with wood and/or plastic panels as an underlay for better load distribution (known as "shoring").

BRIEF DESCRIPTION OF THE DRAWINGS

In the figures, the same structural elements have in each case the same reference numerals.

DETAILED DESCRIPTION OF THE INVENTION

Figure 1:
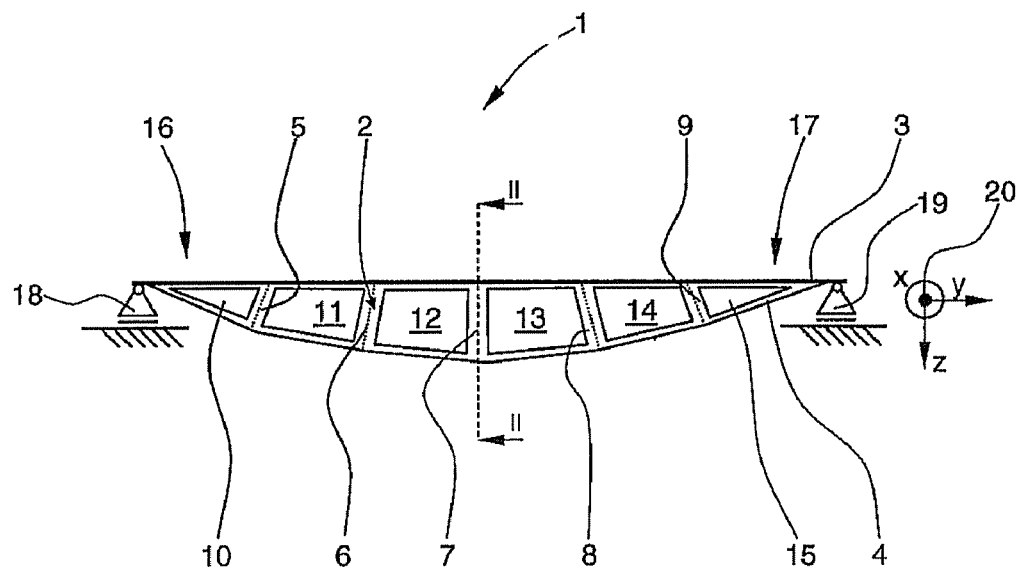
FIG. 1 shows a side view of a milled beam for forming the floor panel according to the invention.

FIG. 1 shows a side view of a milled profile for forming the floor panel according to the invention.

A milled profile 2, formed as a beam 1, for forming the floor panel according to the invention by arranging a plurality of such milled profiles one against the other along their longitudinal edges, comprises an upper flange 3 and a lower flange 4. The upper flange 3 has a straight geometry, whereas the lower flange 4 extends in an arcuate manner, at least in certain portions. Arranged between the upper flange 3 and the lower flange 4 are a plurality of webs 5 to 9, to achieve a defined spacing between the upper flange 3 and the lower flange 4 along their extent. Between the webs 5 to 9 there are six compartments 10 to 15. The compartments 10 to 15 are regions of the beam 1 that have been milled out completely from the beam 1 or just partially milled away, that is to say reduced in their material thickness.

The overall geometrical arrangement of the milled profile 2 milled in one piece from a solid material, with preference a metallic solid material, follows the shaping of the so-called "beam of equal stress", which allows maximum mechanical load-bearing capacity of the beam 1 along with minimum use of material, that is to say the lowest possible overall weight. The two end regions 16, 17 of the milled profile 2 are supported on the rests 18, 19 in such a way that displacements are possible, at least parallel to the y axis of a system of coordinates 20. Such displacements may be initiated, for example, by thermal expansions of the milled beam 2, which are caused by the temperature fluctuations occurring in flight operation of up to 125° C. The rests 18, 19 may be any desired points for introducing forces from the floor panels into downstream structural elements of the fuselage cell of the aircraft. They may be, for example, ring frames, floor channels, the floor framework and other connecting elements for introducing forces into the fuselage skin and/or the fuselage structure.

Figure 2:
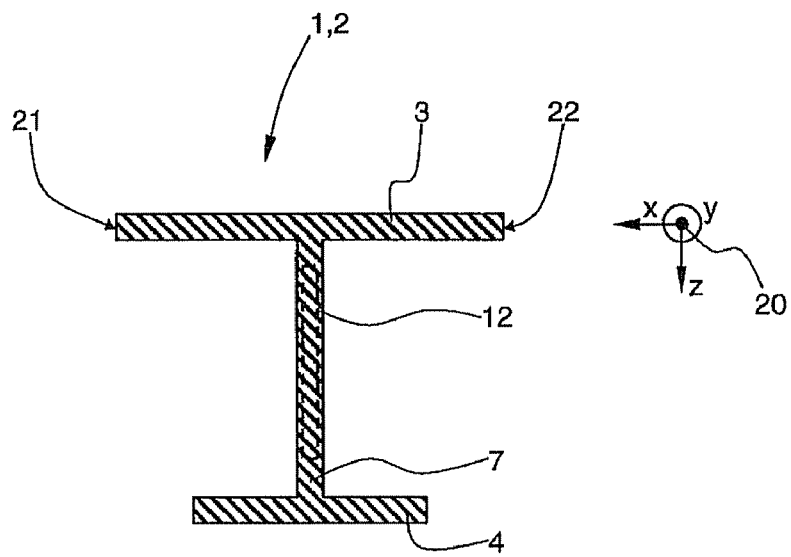
FIG. 2 shows a cross section through a milled beam along the sectional line II-II in FIG. 1.

A floor panel is formed according to the invention by arranging a plurality of milled profiles one against the other in the direction of the x axis (perpendicular to the plane of the drawing), the milled profiles respectively having the same shape as the milled profile 2 represented in FIG. 2. The milled profiles are in this case firmly joined together along their longitudinal edges, that is to say parallel to the y axis or to the plane of the drawing. The joining together of the individual milled profiles may be performed in principle by all known joining methods, but the connection is performed with preference by means of the friction stir welding method.

In a way corresponding to the customary floor panels that are formed with sandwich structures or sandwich panels, the floor panels according to the invention are mounted or laid in a known way on a floor framework of the fuselage structure of the aircraft to form the planar and, with preference, substantially continuous floor.

FIG. 2 shows a cross section through the milled profile along the sectional line II-II of FIG. 1, the system of coordinates illustrating the spatial position.

The beam 1 formed by the milled profile 2 has a substantially double-T-shaped cross-sectional geometry. The upper flange 3 is connected to the lower flange 4 by the web 7. The milled profile 2 is worked from a solid material, that is to say formed in one piece, in order to achieve the required high load-bearing capacity. In addition, the one-piece form increases the accuracy of production. The working of the milled profile 2 is performed with preference by means of known machining production methods, such as for example milling. The milled profile 2 is formed with preference by an aluminium alloy material, which has great toughness to achieve the required flexural rigidity of the milled profile 2, in particular in the direction of the z axis of the system of coordinates 20. The compartment 12, that is to say the milled-out portion or the reduced material thickness of the milled profile 2 in this region, is indicated by the dashed line. In each case along the longitudinal edges 21, 22 that extend perpendicular to the plane of the drawing (parallel to the y axis), the milled profile 2 is respectively welded to a further, identically shaped milled profile to form a planar floor panel with a continuous upper side.

Figure 3:
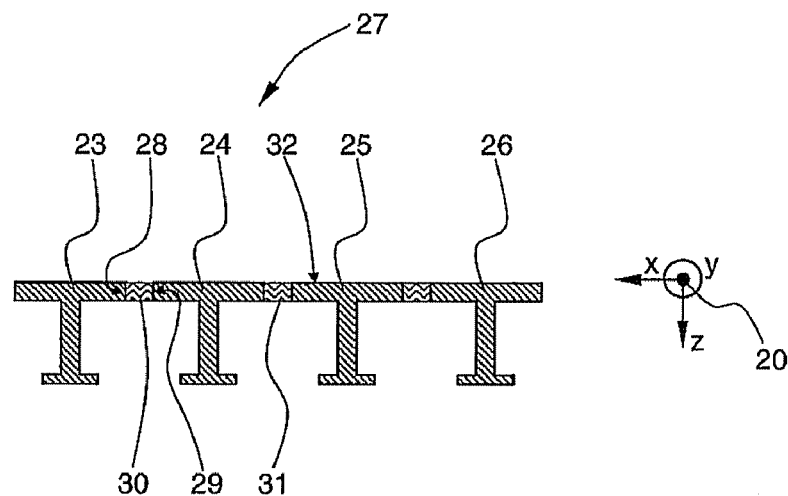
FIG. 3 shows a cross section through a floor panel.

FIG. 3 shows a cross section through a floor panel formed by a plurality of milled profiles that are arranged next to one another and welded.

Four milled profiles 23 to 26 that have been milled out in one piece from a suitable solid aluminium alloy material form a floor panel 27. The milled profiles 23 to 26 are connected in each case along the longitudinal edges, of which only longitudinal edges 28, 29 have been provided with a reference numeral for the sake of a better overview of the drawing, by longitudinal seams 30, 31 formed by means of friction stir welding, that is to say extending parallel to the y axis. The longitudinal seams 30, 31 are formed with preference in a continuous manner and as butt seams. Alternative joining methods, such as for example laser welding, may likewise be used. Alternatively, the joining together of the milled profiles 23 to 26 is possible by means of suitable adhesive bonding methods. On account of the generally high surface quality of friction stir welded seams, the milled profiles 23 to 26 that are joined to one another to form the floor panel 27 also have a virtually planar, continuous upper side 32 in the region of the longitudinal seams. Mechanical finishing of the upper side 32 of the floor panel 27, in particular in the region of the longitudinal seams, for example by milling or grinding, is therefore generally not necessary.

Figure 4:
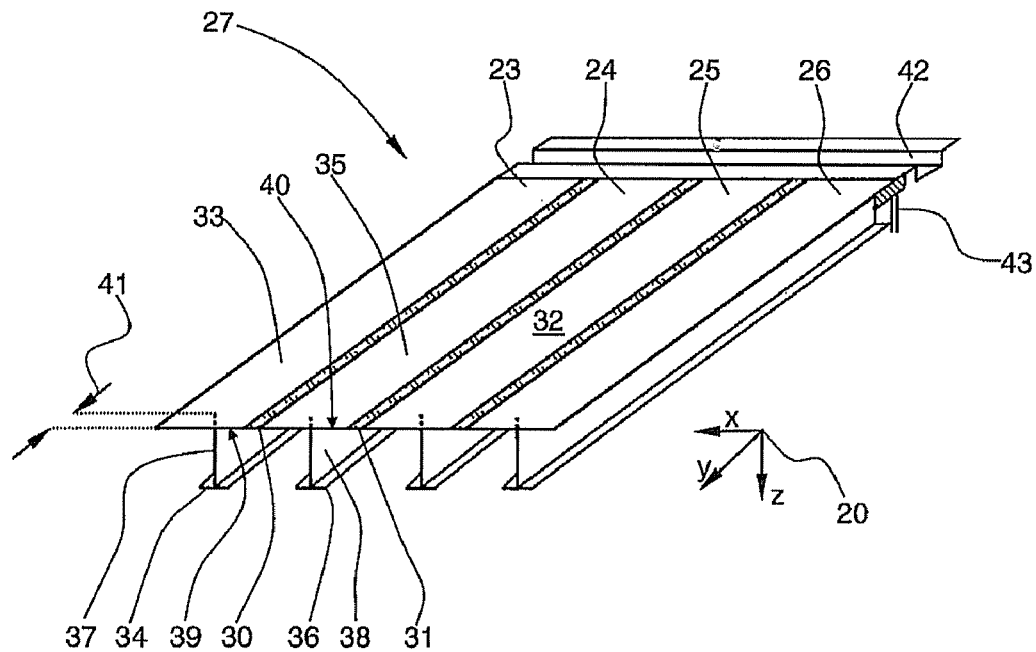
FIG. 4 shows an isometric view of the floor panel.

FIG. 4 illustrates an isometric view of the floor panel joined together by way of example from four milled profiles, in accordance with FIG. 3.

The milled profiles 23 and 24 have in each case an upper flange 33, 35 and, spaced apart from the latter along their extent, a lower flange 34, 36, which are connected by the webs 37, 38. The front edges 39, 40 of the upper flanges 33, 35 project beyond the webs 37, 38 by an overhang 41. The two milled profiles 25 and 26 adjoining on the right have a corresponding construction; the individual elements have not been provided with reference numerals for the sake of a better overview.

The floor panel 27 is adjoined laterally by a channel 42. Lashing points for securing loads, running rollers or running-roller mounting inserts for forming roller conveyors as well as guide rails or the like may be fitted, for example, in the channel 42. The floor panel 27 and the channel 42 rest on a substructure 43, which is not represented any more specifically but introduces the loads that emanate from the floor panel 27 and the channel 42 into the fuselage structure of the aircraft, if appropriate by way of further struts, connecting elements or the like that are not represented.

The floor panel 27 may, in addition, have on two, three or all four sides a further overhang or overhangs formed in a way corresponding to the overhang 41, in order for example to make it possible for it to rest on the substructure 43 or the channel 42 on all sides.

What is claimed is:

1. An aircraft comprising a floor panel for forming a continuous loading area in a cargo hold of the aircraft, the floor panel comprising a plurality of beams that are arranged next to one another and connected to one another, each beam being formed by a milled profile having an upper flange and a lower flange which are connected to one another by a plurality of webs, wherein between the webs compartments are formed as regions of the beam that have been milled out completely from the beam or just partially milled away, wherein the upper flange is wider than the lower flange and, wherein the beams are firmly joined together along longitudinal edges of their upper flanges by friction stir welding.

2. The aircraft according to claim 1, wherein the milled profiles are formed in one piece by an aluminum alloy material.

3. The aircraft according to claim 1, wherein the milled profiles each form a beam of equal stress.

4. The aircraft according to claim 1, wherein the milled profiles each have a substantially double-T-shaped cross-sectional geometry.

5. The aircraft according to claim 1, wherein the upper flanges extend in a straight line and the lower flanges extend in a curved line.

* * * * *